(Model.)
E. W. McGUIRE.
Cutting Apparatus for Lawn and other Mowers.
No. 240,034.          Patented April 12, 1881.
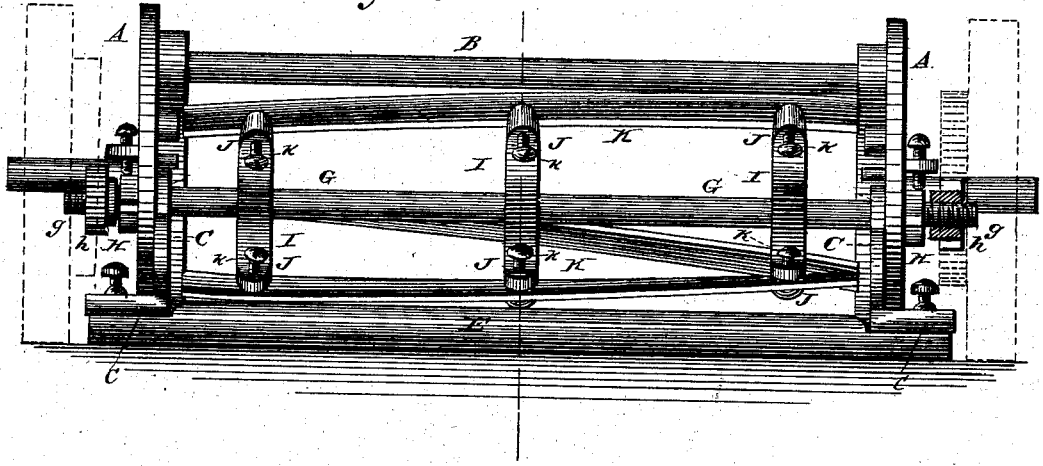
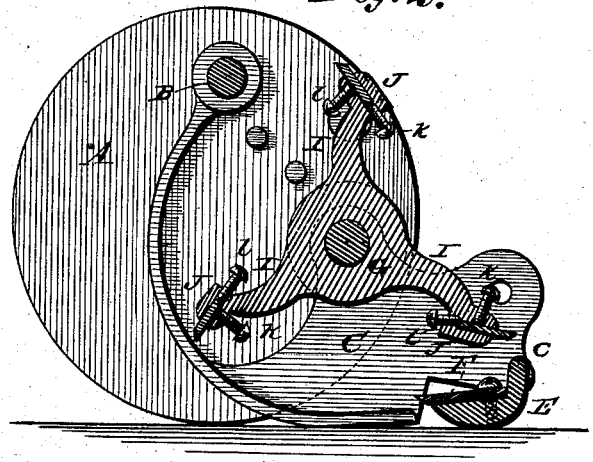
Witnesses:
Fred G. Dieterich
P. C. Dieterich
Inventor
Edward W. McGuire
By De Witt C. Allen
his Attorney
N. PETERS, PHOTO-LITHOGRAPHER, WASHINGTON, D. C.

United States Patent Office.

ELWOOD W. McGUIRE, OF RICHMOND, INDIANA.

CUTTING APPARATUS FOR LAWN AND OTHER MOWERS.

SPECIFICATION forming part of Letters Patent No. 240,034, dated April 12, 1881.

Application filed January 24, 1881. (Model.)

*To all whom it may concern:*

Be it known that I, ELWOOD W. MCGUIRE, a citizen of the United States, residing at Richmond, in the county of Wayne and State of Indiana, have invented certain new and useful Improvements in Cutting Apparatus for Lawn and other Mowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a front view. Fig. 2 is a cross-section.

My invention relates to certain new and useful improvements in cutting apparatus for lawn and other mowers, and more particularly to the class employing revolving blades or cutters in connection with a stationary bed-knife.

The invention has for its object to increase the efficiency and durability of such class of mowers and render them more easy of operation; and to this end the invention consists in a novel means whereby the revolving blades or cutters can be independently adjusted with relation to the stationary bed-knife, all as will be hereinafter fully described, and particularly designated in the claim.

To enable others skilled in the art with which my invention is most nearly connected to make and use the same, I will now proceed to describe its construction and operation.

In the drawings, A A represent the two disks usually employed for closing the open ends of the hollow drive-wheels carrying interior mechanism for operating the revolving cutters.

B represents a transverse shaft rigidly connecting the disks A A.

C C represent front projecting plates connected to or formed integral with the disks A A, and having right-angled portions *c c*, to the under side of which is adjustably secured the knife or cutter bar E, supporting the stationary bed-knife F.

G represents the shaft of the revolving cutters, passing through the disks A A, and supported in adjustable bearings H H. This shaft G is provided at the ends with right and left hand screw-threads *g g*, upon which are screwed the pinions or small gears *h h*, having corresponding interior screw-threads.

By this construction the use of pins and other auxiliary devices, which are apt to work out or get loose, and usually employed for this purpose, is entirely dispensed with, as the screw-threads are so arranged that the pressure on the pinions or small gears from the large gears which mesh with and drive them is always in the direction of their revolution and in the direction they screw upon the shafts, so that it is impossible for them to work loose or off during the operation of the machine, but which can be easily and readily removed, when desired, without danger of breaking anything.

The shaft G has a series of spiders, I, securely mounted thereon, having a series of projecting slotted heads or jaws, J, for the reception of the solid blades or cutters K, which are preferably arranged spirally, and which are removably secured centrally and near the ends in said slotted heads or jaws by set-screws *k*, passing transversely through one of the jaws and engaging with the side of the blades or cutters and pressing or holding them securely against the other jaw, the slotted heads or jaws in connection with said screws rendering them doubly secure.

*l* represents adjusting-screws passing through the back side of the portion forming the slotted head or jaws and engaging with the backs of the blades or cutters. These adjusting-screws *l* afford easy facilities for the proper adjustment of the blades or cutters K independently of each other with relation to the stationary bed-knife F, and which also prevent the blades or cutters being set back by any sudden shocks.

The above manner of securing the blades or cutters K affords easy facilities for independently removing and replacing any of them without removing or disturbing any other part of the apparatus, while they may be adjusted independently of each other and one end of the blade or cutter without moving the center or other end, or the center without disturbing either end, in order to form a close or complete joint between them and the stationary bed-knife F.

Experience has demonstrated that the whole secret in making the class of mowers cut well is not so much in having the blades or cutters so sharp, but in having them make a complete joint or come in close contact throughout their entire length with the stationary bed-knife, and which, while being accomplished with ease and facility by the above-described means of adjustment, enables any unskilled person, with the use of a screw-driver, to keep the mower or cutting apparatus always in order.

By the above-described construction and arrangement of parts ample space is left between the spiders I and disks A to prevent grass or other rubbish from winding up or around the cutter-shaft, while the open cutters make the mower much lighter.

By having the revolving blades or cutters always properly adjusted relative to the stationary bed-knife the cutters will wear themselves sharp or be self-sharpening.

I am aware that a cutter-stock provided with longitudinal and transverse slots and grooves for the reception of set-screws and screw-hooks and nuts passing through slotted knives for the purpose of fastening and adjusting the knives relative to the bed-knife is old in lawn-mowers, and such I do not wish to be understood as claiming, broadly, as of my invention.

Having thus fully described my invention, what I claim as new, and desire to secure by Letters Patent, is—

In a cutting apparatus for lawn and other mowers, the combination, with the bed-knife F, of a revolving shaft carrying a series of spiders having slotted heads or jaws J, solid blades or cutters arranged in said slotted heads or jaws, set-screws $k$, passing transversely through one portion of said slotted heads or jaws, and pressing said blades against the other portions thereof, for securing the blades in position, and adjusting-screws $l$, passing through the back side of the portion forming said slotted heads or jaws and engaging with the back of said blades or cutters, substantially in the manner herein shown and described.

In testimony whereof I affix my signature in presence of two witnesses.

ELWOOD W. McGUIRE.

Witnesses:
J. F. ELDER,
W. H. STANLEY.